US008976716B2

(12) United States Patent
Zhou

(10) Patent No.: US 8,976,716 B2
(45) Date of Patent: Mar. 10, 2015

(54) METHOD, DEVICE, AND CONFERENCE SYSTEM FOR PROCESSING MEDIA DATA PACKET

(71) Applicant: Huawei Technologies Co., Ltd., Shenzhen (CN)

(72) Inventor: Riming Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/276,160

(22) Filed: May 13, 2014

(65) Prior Publication Data

US 2014/0247756 A1    Sep. 4, 2014

Related U.S. Application Data

(63) Continuation of application No. PCT/CN2012/078910, filed on Jul. 20, 2012.

(30) Foreign Application Priority Data

Nov. 14, 2011   (CN) .......................... 2011 1 0358975

(51) Int. Cl.
*H04L 29/06* (2006.01)
*H04L 12/18* (2006.01)

(52) U.S. Cl.
CPC .......... *H04L 29/06421* (2013.01); *H04L 12/18* (2013.01); *H04L 29/06517* (2013.01)
USPC ............ 370/300; 370/263; 370/389; 370/390

(58) Field of Classification Search
USPC ......................................... 370/300, 390, 389
See application file for complete search history.

(56) References Cited

U.S. PATENT DOCUMENTS

| 7,813,305 B2 | 10/2010 | Baker et al. |
| 2003/0108000 A1 | 6/2003 | Chaney et al. |

(Continued)

FOREIGN PATENT DOCUMENTS

| CN | 101155053 A | 4/2008 |
| CN | 101232465 A | 7/2008 |

(Continued)

OTHER PUBLICATIONS

Foreign Communication From a Counterpart Application, European Application No. 12849939.9, Extended European Search Report dated Nov. 14, 2014, 12 pages.

(Continued)

*Primary Examiner* — Dang Ton
*Assistant Examiner* — Pamit Kaur
(74) *Attorney, Agent, or Firm* — Conley Rose, P.C.; Grant Rodolph; Nicholas K. Beaulieu

(57) ABSTRACT

A method, a device, and a conference system for processing a media data packet are provided. The method includes: establishing with a conference proxy server (CPS), a virtual public participant (VPP) channel corresponding to a conference identity; when there are media data packets with same content in a media data packet corresponding to each conference member identity, acquiring a media data packet with a highest frequency of same content among the media data packets as a public media data packet, and forwarding the public media data packet to the CPS through the VPP channel; acquiring a conference member identity that currently does not multiplex the VPP channel, generating a real-time transport protocol control protocol (RTCP) multiplexing start command corresponding to the conference member identity, and delivering the RTCP multiplexing start command to the CPS, so that the CPS starts to forward the public media data packet to a user equipment corresponding to the conference member identity.

11 Claims, 7 Drawing Sheets

(56) References Cited

U.S. PATENT DOCUMENTS

| | | |
|---|---|---|
| 2003/0147386 A1 | 8/2003 | Zhang et al. |
| 2009/0119389 A1 | 5/2009 | Mu et al. |
| 2013/0103763 A1 | 4/2013 | Zhou |

FOREIGN PATENT DOCUMENTS

| | | | |
|---|---|---|---|
| CN | 101505226 | A | 8/2009 |
| CN | 101645784 | A | 2/2010 |
| CN | 101662699 | A | 3/2010 |
| CN | 102082674 | A | 6/2011 |
| CN | 102136920 | A | 7/2011 |
| CN | 102427406 | A | 4/2012 |
| CN | 102427406 | B | 3/2014 |
| EP | 2587723 | A1 | 5/2013 |
| WO | 0079734 | A1 | 12/2000 |

OTHER PUBLICATIONS

Rosenberg, J., et al., "SIP: Session Initiation Protocol," RFC 3261, Jun. 2002, 265 pages.

Schulzrinne, H., et al., "RTP: A Transport Protocol for Real-Time Applications," RFC 3550, Jul. 2003, 103 pages.

Partial English Translation and Abstract of Chinese Patent Application No. CN102427406A, Jul. 25, 2014, 4 pages.

Foreign Communication From a Counterpart Application, PCT Application No. PCT/CN2012/078910, English Translation of International Search Report dated Oct. 18, 2012, 2 pages.

Foreign Communication From a Counterpart Application, PCT Application No. PCT/CN2012/078910, English Translation of Written Opinion dated Oct. 18, 2012, 7 pages.

Foreign Communication From a Counterpart Application, Chinese Application No. 201110358975.8, Chinese Office Action dated Jul. 31, 2013, 5 pages.

Foreign Communication From a Counterpart Application, Chinese Application No. 201110358975.8, Chinese Notice of Allowance dated Jan. 2, 2014, 2 pages.

Foreign Communication From a Counterpart Application, Chinese Application No. 201110358975.8, English Translation of Chinese Notice of Allowance dated Jan. 2, 2014, 6 pages.

Foreign Communication From a Counterpart Application, Chinese Application No. 201110358975.8, English Translation of Chinese Office Action dated Jul. 31, 2013, 12 pages.

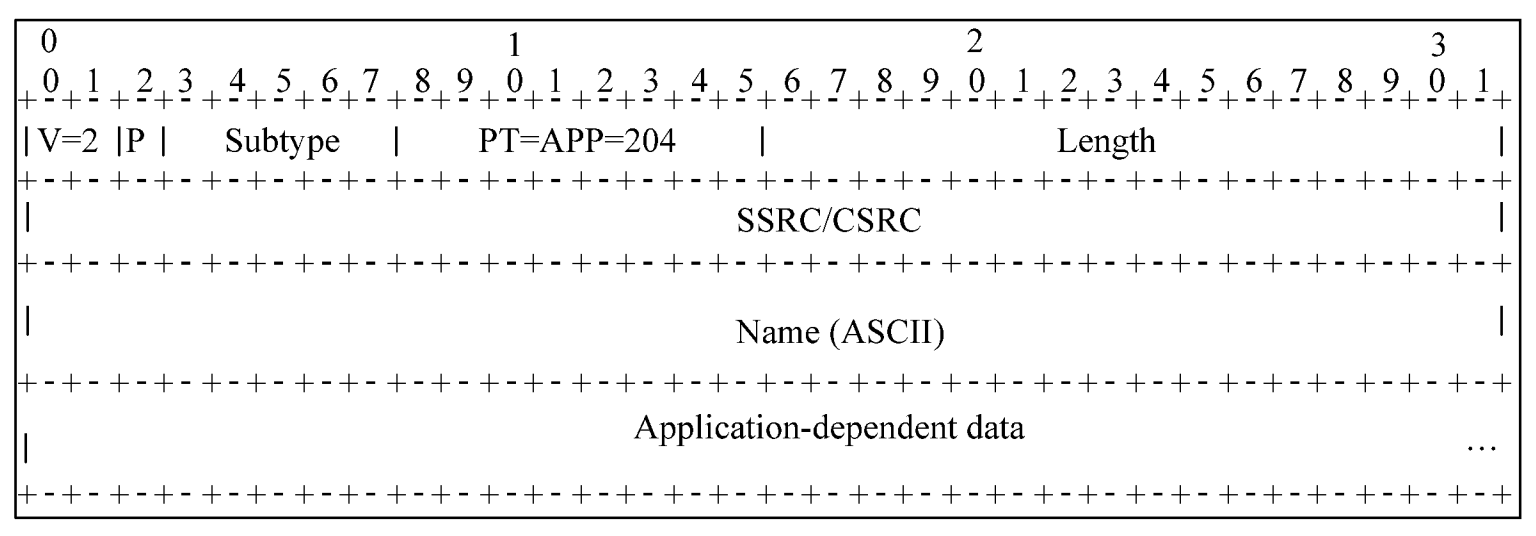

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|  Subtype  |   PT=APP=204  |             Length            |
+-+-+-+-+-+-+-+-+-+-+-+-+-+-+-+-+-+-+-+-+-+-+-+-+-+-+-+-+-+-+-+-+
|                           SSRC/CSRC                            |
+-+-+-+-+-+-+-+-+-+-+-+-+-+-+-+-+-+-+-+-+-+-+-+-+-+-+-+-+-+-+-+-+
|                          Name (ASCII)                          |
+-+-+-+-+-+-+-+-+-+-+-+-+-+-+-+-+-+-+-+-+-+-+-+-+-+-+-+-+-+-+-+-+
|                    Application-dependent data                ...
+-+-+-+-+-+-+-+-+-+-+-+-+-+-+-+-+-+-+-+-+-+-+-+-+-+-+-+-+-+-+-+-+
```

FIG. 3

METHOD, DEVICE, AND CONFERENCE SYSTEM FOR PROCESSING MEDIA DATA PACKET

CROSS-REFERENCE TO RELATED APPLICATIONS

This application is a continuation of International Application No. PCT/CN2012/078910, filed on Jul. 20, 2012, which claims priority to Chinese Patent Application No. 201110358975.8, filed on Nov. 14, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communications technologies, and in particular, to a method, a device, and a conference system for processing a media data packet.

BACKGROUND

At present, to improve working efficiency, simplify a business process, and reduce business travel expenses of the staff, both enterprises and groups with branches select to use a conference system. The conference system is geographically dispersed.

Specifically, a main working principle of the conference system is that a conference access party accesses a conference floor server directly, and the conference floor server communicates with each conference access party directly. Alternatively, a conference access party accesses a conference floor server through a proxy, the proxy maintains, for each conference access party, a connection to the conference floor server, and transparently transmits media from the conference floor server to the conference access party, where the media includes conference mixed voices, video broadcast, data conference broadcast, or the like.

In a process of implementing the present invention, the inventor finds that the prior art has at least the following problem: because the conference floor server needs to deliver media to each conference access party, but media of most of conference access parties are the same, a large number of downlink bandwidth resources are wasted.

SUMMARY

Embodiments of the present invention provide a method, a device, and a conference system for processing a media data packet, which are used to overcome a defect in the prior art that downlink bandwidth resources are wasted because a conference floor server needs to deliver media to each conference access party.

An embodiment of the present invention provides a method for processing a media data packet, where the method includes: receiving, by a conference floor server (CFS), a virtual public participant (VPP) channel establishment request sent by a conference proxy server (CPS), where the VPP channel establishment request includes a conference identity and a conference member identity corresponding to the conference identity; and establishing, with the CPS, according to the VPP channel establishment request, a VPP channel corresponding to the conference identity; acquiring, by the CFS, a media data packet corresponding to each conference member identity, and when there are media data packets with same content in the media data packet corresponding to each conference member identity, acquiring a media data packet with a highest frequency of same content among the media data packets as a public media data packet, and forwarding the public media data packet to the CPS through the VPP channel; and acquiring, by the CFS, from conference member identities corresponding to the public media data packet, a conference member identity that currently does not multiplex the VPP channel, generating a real-time transport protocol control protocol (RTCP) multiplexing start command corresponding to the conference member identity that currently does not multiplex the VPP channel, and delivering the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel.

An embodiment of the present invention further provides a method for processing a media data packet, where the method includes: when detecting that conference requests sent by at least two user equipments include a same CFS identity and conference identity, establishing, by a CPS, on a CFS corresponding to the CFS identity, a VPP channel corresponding to the conference identity; receiving, by the CPS, an RTCP multiplexing start command which is delivered by the CFS and corresponds to a conference member identity, where the conference member identity is an identity of a user equipment participating in a conference corresponding to the conference identity; and forwarding, by the CPS, according to the RTCP multiplexing start command corresponding to the conference member identity, a public media data packet delivered by the CFS through the VPP channel, to the user equipment corresponding to the conference member identity.

An embodiment of the present invention provides a CFS, including: a VPP channel establishing module configured to receive a VPP channel establishment request sent by a CPS, where the VPP channel establishment request includes a conference identity and a conference member identity corresponding to the conference identity; and establish, with the CPS, according to the VPP channel establishment request, a VPP channel corresponding to the conference identity; a conference media processor configured to acquire a media data packet corresponding to each conference member identity, and when there are media data packets with same content in the media data packet corresponding to each conference member identity, acquire a media data packet with a highest frequency of same content among the media data packets as a public media data packet; and a media forwarder configured to forward the public media data packet to the CPS through the VPP channel, where the conference media processor is further configured to acquire, from conference member identities corresponding to the public media data packet, a conference member identity that currently does not multiplex the VPP channel, generate an RTCP multiplexing start command corresponding to the conference member identity that currently does not multiplex the VPP channel, and deliver the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel.

An embodiment of the present invention provides a CPS, including: a VPP channel establishing module configured to, when detecting that conference requests sent by at least two user equipments include a same CFS identity and conference identity, establish, on a CFS corresponding to the CFS identity, a VPP channel corresponding to the conference identity; a receiving module configured to receive an RTCP multiplexing start command which is delivered by the CFS and corresponds to a conference member identity, where the conference member identity is an identity of a user equipment participating in a conference corresponding to the conference identity; and a processing module configured to forward, according to the RTCP multiplexing start command corresponding to the conference member identity, a public media data packet delivered by the CFS through the VPP channel, to the user equipment corresponding to the conference member identity.

An embodiment of the present invention provides a conference system, including the CFS, the CPS, and a user equipment.

In the method, the device, and the conference system for processing a media data packet according to the embodiments of the present invention, a CFS establishes, with a CPS, according to a received VPP channel establishment request sent by the CPS, a VPP channel corresponding to a conference identity in the VPP channel establishment request, acquires a media data packet corresponding to each conference member identity in the VPP channel establishment request, and when there are media data packets with same content in the media data packet corresponding to each conference member identity, acquires a media data packet with a highest content repeat frequency among the media data packets as a public media data packet, and forwards the public media data packet to the CPS through the VPP channel; and acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel, thereby reducing repeated delivering of media, overcoming a defect in the prior art that downlink bandwidth resources are wasted because the CFS needs to deliver media to each conference access party, and further improving a bandwidth utilization ratio.

BRIEF DESCRIPTION OF THE DRAWINGS

To describe the technical solutions according to the embodiments of the present invention or in the prior art more clearly, accompanying drawings required for describing the embodiments or the prior art are introduced briefly in the following. The accompanying drawings in the following descriptions merely show some embodiments of the present invention, and persons of ordinary skill in the art may further obtain other drawings according to these accompanying drawings without creative efforts.

FIG. 3 is an extended diagram of an RTCP multiplexing start command or an RTCP multiplexing stop command on an APP structure body of an RTCP;

DETAILED DESCRIPTION

In order to make the objectives, technical solutions, and advantages of the embodiments of the present invention more comprehensible, the technical solutions according to the embodiments of the present invention are clearly described in the following with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
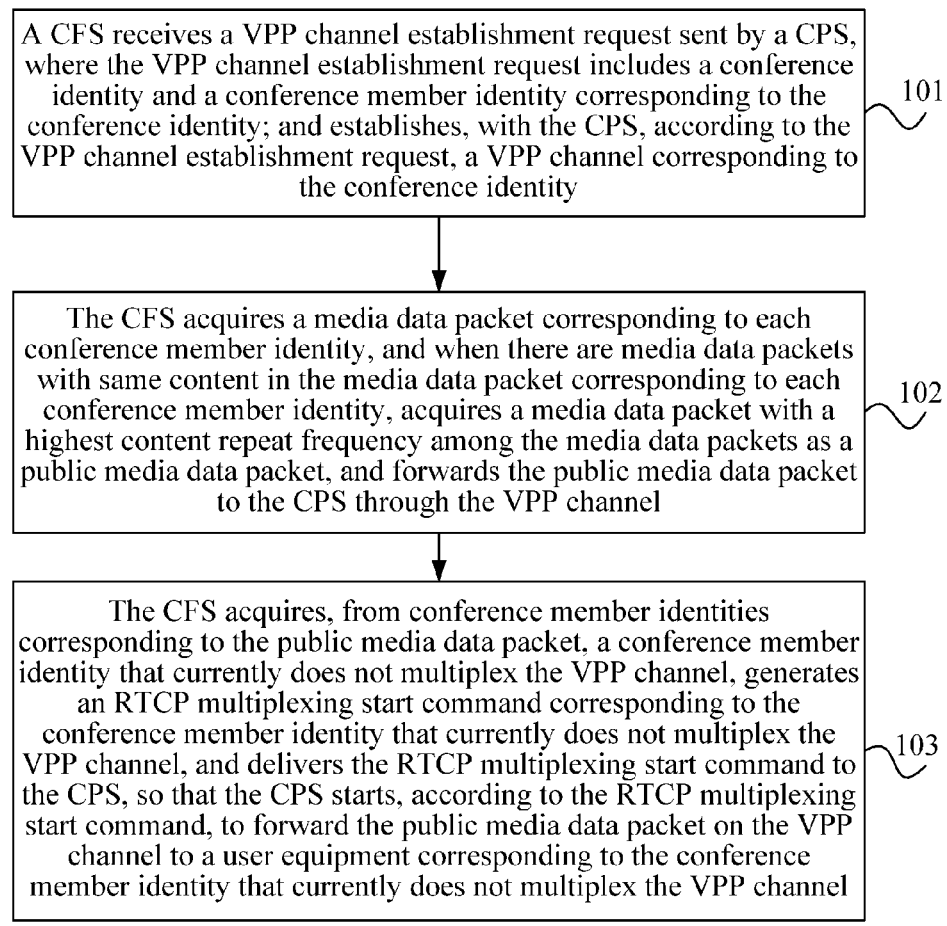
FIG. 1 is a flowchart of an embodiment of a method for processing a media data packet according to the present invention.

FIG. 1 is a flowchart of an embodiment of a method for processing a media data packet according to the present invention. As shown in FIG. 1, the method in this embodiment includes:

Step 101: A CFS receives a VPP channel establishment request sent by a conference proxy server CPS, where the VPP channel establishment request includes a conference identity and a conference member identity corresponding to the conference identity; and establishes, with the CPS, according to the VPP channel establishment request, a VPP channel corresponding to the conference identity.

In this embodiment, branches may be divided according to areas, and a CPS is deployed in each area or local area network (that is, a plurality of areas), so that a user equipment (UE) may access a CFS through the CPS. Specifically, the CPS receives a conference request sent by the user equipment, where the conference request includes a CFS identity and a conference identity, and the user equipment is added, according to the conference request, to a conference which corresponds to the conference identity and is on a CFS corresponding to the CFS identity. In addition, when detecting that conference requests sent by at least two user equipments include a same CFS identity and conference identity, the CPS sends a VPP channel establishment request to the CFS, where the VPP channel establishment request includes the conference identity and a conference member identity corresponding to the conference identity, so that the CFS establishes, with the CPS, according to the VPP channel establishment request, a VPP channel corresponding to the conference identity.

In addition, in this embodiment, the VPP channel provided in the embodiment of the present invention may be implemented through a session-layer signaling control protocol (e.g., Session Initiation Protocol (SIP)), and for example, its implementation manner is as follows:

```
"INVITE sip:confid@example.com
P-Asserted-Identity: sip:vpp@example.com
From: sip:vpp@example.com
Content-Type: application/xml
...........................................
<xml>
    <vpp-participants action="ADD|DEL">
        <participant uri=sip:user1@example.com />
        <participant uri=sip:user2@example.com />
        <participant uri=sip:user3@example.com />
        ......
    </vpp-participants>
</xml>"
``` where, "sip:confid@example.com" is used for indicating a conference identity; in a message header field, "P-Asserted-Identity" and/or "From: sip:vpp@example.com" is used for indicating a VPP channel identity; in a message body, "vpp-participants" includes one to more "participant" nodes, each node is used for indicating a conference member identity (that is, "participant uri"), and the conference member identity may be a number of a user to which a user equipment corresponding to the conference member identity belongs. In addition, "vpp-participants" has an attribute, and when a value of the attribute is "ADD", it indicates that a user equipment corresponding to a new conference member identity participates in a VPP channel corresponding to the VPP channel identity; and when the value of the attribute is "DEL", it indicates that a user equipment corresponding to a conference member identity exits from the conference corresponding to the conference identity, that is, the VPP channel corresponding to the VPP channel identity is no longer multiplexed.

Step 102: The CFS acquires a media data packet corresponding to each conference member identity, and when there are media data packets with same content in the media data packet corresponding to each conference member identity, acquires a media data packet with a highest content repeat frequency among the media data packets as a public media data packet, and forwards the public media data packet to the CPS through the VPP channel.

In this embodiment, the media data packet may be a real-time transport protocol (RTP) packet. In addition, the public media data packet is specifically forwarded to the CPS through an RTP channel on the VPP channel.

Step 103: The CFS acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel.

In this embodiment, the CFS acquires a media data packet corresponding to each conference member identity in the conference, and when there are media data packets with same content in the media data packet corresponding to each conference member identity, acquires a media data packet with a highest content repeat frequency among the media data packets as a public media data packet, and forwards the public media data packet to the CPS through the VPP channel. Meanwhile, the CFS acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS forwards, according to the RTCP multiplexing start command, the public media data packet on the VPP channel to a user equipment corresponding to the conference member identity that currently does not multiplex the VPP channel.

For example, the technical solution in this embodiment is described in detail by using an example that there are five conference member identities corresponding to the conference identity, which are a first conference member identity, a second conference member identity, a third conference member identity, a fourth conference member identity, and a fifth conference member identity respectively. The CFS acquires a media data packet corresponding to each of the five conference member identities. Media data packets corresponding to the first conference member identity and the second conference member identity have same content, media data packets corresponding to the third conference member identity, the fourth conference member identity, and the fifth conference member identity have same content, a repeat frequency of the media data packets corresponding to the first conference member identity and the second conference member identity is 2, and a repeat frequency of the media data packets corresponding to the third conference member identity, the fourth conference member identity, and the fifth conference member identity is 3. Therefore, the media data packet corresponding to the third conference member identity, the fourth conference member identity, or the fifth conference member identity serves as a public media data packet, and the public media data packet is forwarded to the CPS through the VPP channel.

In addition, when the third conference member identity, the fourth conference member identity, and the fifth conference member identity are all conference member identities that currently do not multiplex the VPP channel, for example, the CPS currently triggers an RTP channel which corresponds to the third conference member identity and is between the CPS and a user equipment corresponding to the third conference member identity to transmit a media data packet which corresponds to the third conference member identity and is on an RTP channel between the CFS and the CPS to the user equipment corresponding to the third conference member identity, and accordingly, the CFS may respectively generate an RTCP multiplexing start command corresponding to the third conference member identity, an RTCP multiplexing start command corresponding to the fourth conference member identity, and an RTCP multiplexing start command corresponding to the fifth conference member identity, transmits the RTCP multiplexing start command corresponding to the third conference member identity to the CPS through an RTCP channel corresponding to the third conference member identity, transmits the RTCP multiplexing start command corresponding to the fourth conference member identity to the CPS through an RTCP channel corresponding to the fourth conference member identity, and transmits the RTCP multiplexing start command corresponding to the fifth conference member identity to the CPS through an RTCP channel corresponding to the fifth conference member identity, so that after receiving the RTCP multiplexing start command corresponding to the third conference member identity, the CPS starts to forward the public media data packet on the VPP channel to the user equipment corresponding to the third conference member identity; after receiving the RTCP multiplexing start command corresponding to the fourth conference member identity, the CPS starts to forward the public media data packet on the VPP channel to a user equipment corresponding to the fourth conference member identity; and after receiving the RTCP multiplexing start command corresponding to the fifth conference member identity, the CPS starts to forward the public media data packet on the VPP channel to a user equipment corresponding to the fifth conference member identity.

It should be further noted that, the CFS may forward a first media data packet to the CPS respectively through an RTP channel corresponding to the first conference member identity and an RTP channel corresponding to the second conference member identity. After receiving the first media data packet transmitted by the RTP channel corresponding to the first conference member identity, the CPS forwards the first media data packet to a user equipment corresponding to the first conference member identity; and after receiving the first media data packet transmitted by the RTP channel corresponding to the second conference member identity, the CPS forwards the first media data packet to a user equipment corresponding to the second conference member identity.

In this embodiment, a CFS establishes, with a CPS, according to a received VPP channel establishment request sent by the CPS, a VPP channel corresponding to a conference identity in the VPP channel establishment request, acquires a media data packet corresponding to each conference member identity in the VPP channel establishment request, and when there are media data packets with same content in the media data packet corresponding to each conference member identity, acquires a media data packet with a highest content repeat frequency among the media data packets as a public media data packet, and forwards the public media data packet to the CPS through the VPP channel; and acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel, thereby reducing repeated delivering of media, overcoming a defect in the prior art that downlink bandwidth resources are wasted because the conference access server needs to deliver media to each conference access party, and further improving a bandwidth utilization ratio.

Figure 2A:
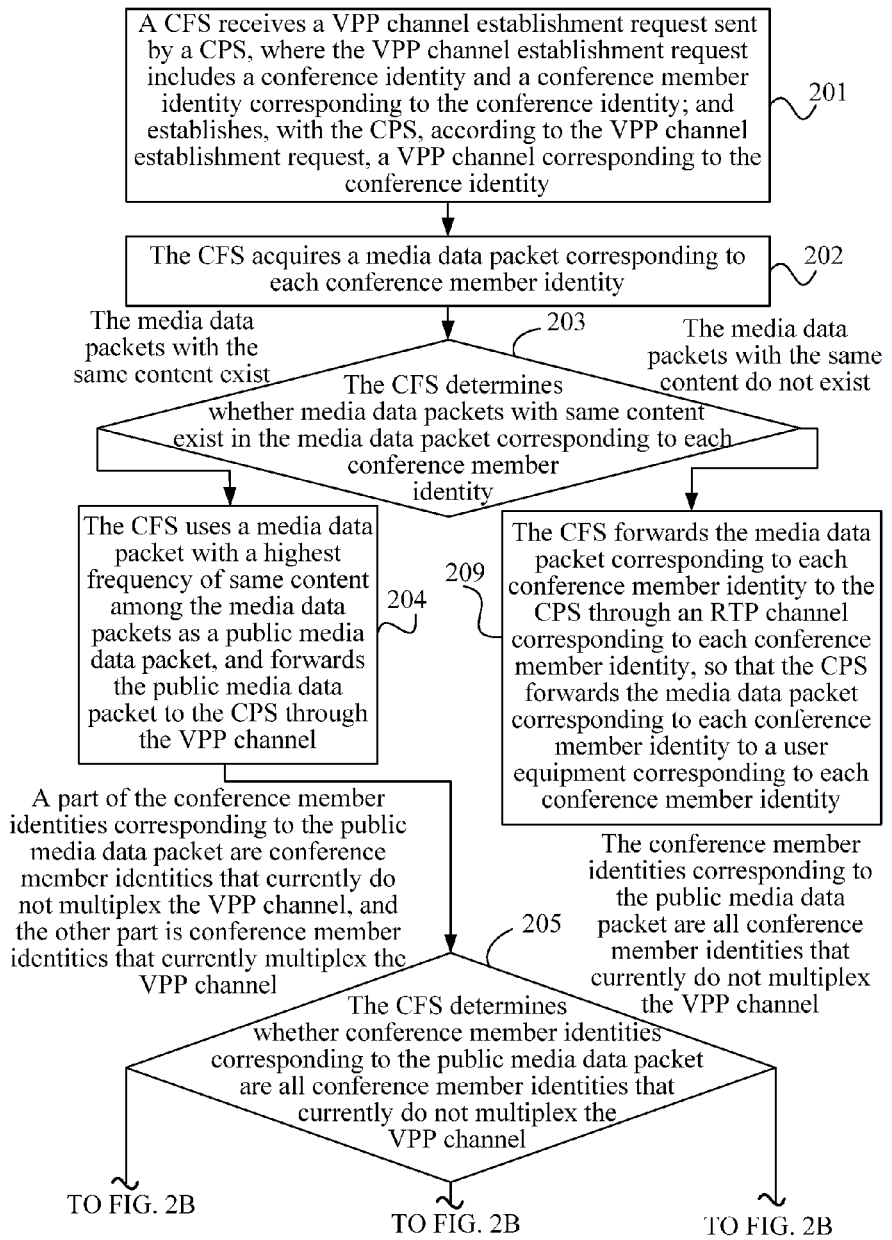
FIG. 2A and FIG. 2B are a flowchart of another embodiment of a method for processing a media data packet according to the present invention.
Figure 2B:
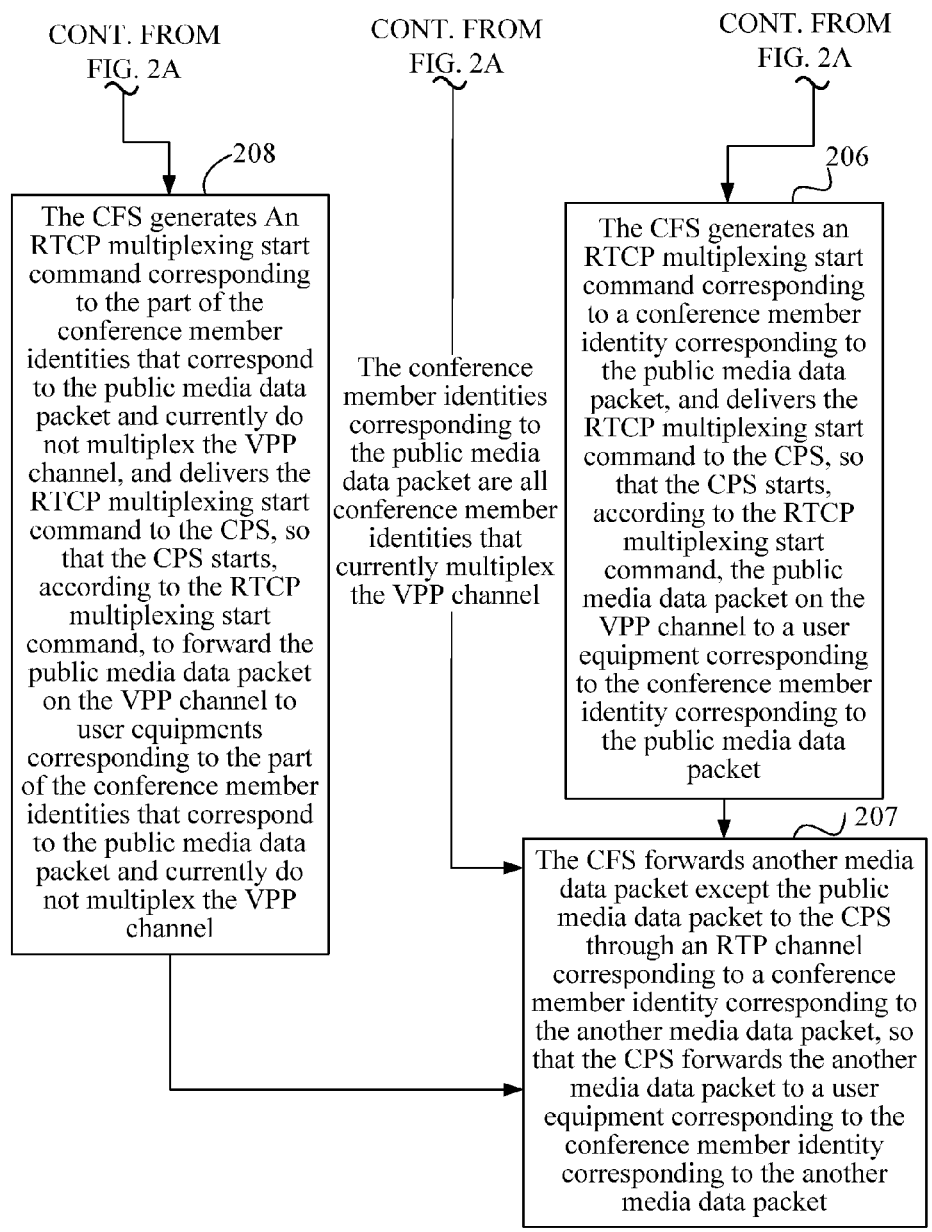

FIG. 2A and FIG. 2B are a flowchart of another embodiment of a method for processing a media data packet according to the present invention. As shown in FIG. 2A and FIG. 2B, the method in this embodiment includes:

Step 201: A CFS receives a VPP channel establishment request sent by a CPS, where the VPP channel establishment request includes a conference identity and a conference member identity corresponding to the conference identity; and establishes, with the CPS, according to the VPP channel establishment request, a VPP channel corresponding to the conference identity.

In this embodiment, an implementation manner of step 201 is similar to an implementation manner of step 101 shown in FIG. 1, and is not repeatedly described herein.

Step 202: The CFS acquires a media data packet corresponding to each conference member identity.

Step 203: The CFS determines whether media data packets with same content exist in the media data packet corresponding to each conference member identity, and if the media data packets with the same content exist, perform step 204; and if the media data packets with the same content do not exist, perform step 209.

Step 204: The CFS uses a media data packet with a highest frequency of same content among the media data packets as a public media data packet, and forwards the public media data packet to the CPS through the VPP channel.

Step 205: The CFS determines whether conference member identities corresponding to the public media data packet are all conference member identities that currently do not multiplex the VPP channel, and if the conference member identities corresponding to the public media data packet are all conference member identities that currently do not multiplex the VPP channel, perform step 206; if the conference member identities corresponding to the public media data packet are all conference member identities that currently multiplex the VPP channel, perform step 207; and if a part of the conference member identities corresponding to the public media data packet are conference member identities that currently do not multiplex the VPP channel, and the other part of the conference member identities corresponding to the public media data packet are conference member identities that currently multiplex the VPP channel, perform step 208.

In this embodiment, if the conference member identities corresponding to the public media data packet are all conference member identities that currently multiplex the VPP channel, it indicates that the CPS is currently triggering an RTP channel which corresponds to a conference member identity corresponding to the public media data packet and is between the CPS and a user equipment corresponding to the conference member identity corresponding to the public media data packet to forward the public media data packet on the VPP channel.

Step 206: The CFS generates an RTCP multiplexing start command corresponding to a conference member identity corresponding to the public media data packet, and delivers the RTCP multiplexing start command to the CPS, so that the CPS starts, according to the RTCP multiplexing start command, to forward the public media data packet on the VPP channel to a user equipment corresponding to the conference member identity corresponding to the public media data packet.

Step 207: The CFS forwards another media data packet except the public media data packet to the CPS through an RTP channel corresponding to a conference member identity corresponding to the another media data packet, so that the CPS forwards the another media data packet to a user equipment corresponding to the conference member identity corresponding to the another media data packet. The process ends.

In this embodiment, for example, that there are three conference member identities corresponding to the conference identity, which are a first conference member identity, a second conference member identity, and a third conference member identity respectively is used as an example, where a user to which a user equipment corresponding to the first conference member identity belongs speaks, and users to which user equipments corresponding to the second conference member identity and the third conference member identity belong are listeners, media data packets which are acquired by the CFS and correspond to the second conference member identity and the third conference member identity have same content, and a frequency of same content of the media data packets is 2. Therefore, the media data packet corresponding to the second conference member identity or the third conference member identity serves as a public media data packet, and the public media data packet is forwarded to the CPS through the VPP channel.

In addition, when the first conference member identity and the second conference member identity are both conference member identities that currently do not multiplex the VPP channel, the CFS respectively generates an RTCP multiplexing start command corresponding to the first conference member identity and an RTCP multiplexing start command corresponding to the second conference member identity, delivers the RTCP multiplexing start command corresponding to the first conference member identity to the CPS through an RTCP channel corresponding to the first conference member identity, and delivers the RTCP multiplexing start command corresponding to the second conference member identity to the CPS through an RTCP channel corresponding to the second conference member identity. After receiving the RTCP multiplexing start command on the RTCP channel corresponding to the first conference member identity, the CPS instructs an RTP channel which corresponds to the first conference member identity and is between the CPS and a user equipment corresponding to the first conference member identity to transmit the public media data packet on the VPP channel starting from a certain media data packet serial number. After receiving the RTCP multiplexing start command on the RTCP channel corresponding to the second conference member identity, the CPS instructs an RTP channel which corresponds to the second conference member identity and is between the CPS and a user equipment corresponding to the second conference member identity to transmit the public media data packet on the VPP channel starting from a certain media data packet serial number.

It should be further noted that, the CFS may forward the media data packet corresponding to the first conference member identity to the CPS through an RTP channel which corresponds to the first conference member identity and is between the CFS and the CPS, and when the media data packet corresponding to the first conference member identity is received on the RTP channel which corresponds to the first conference member identity and is between the CFS and the CPS, and the RTCP multiplexing start command corresponding to the first conference member identity is not received, the CPS forwards the media data packet corresponding to the first conference member identity to the user equipment corresponding to the first conference member identity through an RTP channel which corresponds to the first conference member identity and is between the CPS and the user equipment corresponding to the first conference member identity.

Step 208: The CFS generates an RTCP multiplexing start command corresponding to the part of the conference member identities that correspond to the public media data packet and currently do not multiplex the VPP channel, and delivers the RTCP multiplexing start command to the CPS, so that the CPS starts, according to the RTCP multiplexing start command, to forward the public media data packet on the VPP channel to user equipments corresponding to the part of the conference member identities that correspond to the public media data packet and currently do not multiplex the VPP channel. Then, perform step 207.

In this embodiment, for example, when the user to which the user equipment corresponding to the first conference member identity belongs stops speaking, and the user to which the user equipment corresponding to the second conference member identity belongs starts to speak, that is, the users to which the user equipments corresponding to the first conference member identity and the third conference member identity belong are listeners, media data packets which are acquired by the CFS and correspond to the first conference member identity and the third conference member identity have same content, that is, a frequency of same content of the media data packets is 2, and accordingly, the media data packet serves as a public media data packet, and is forwarded to the CPS through the VPP channel. Because the first conference member identity corresponding to the public media data packet is a conference member identity that currently does not multiplex the VPP channel, the CFS generates an RTCP multiplexing start command corresponding to the first conference member identity, and delivers the RTCP multiplexing start command corresponding to the first conference member identity to the CPS. In addition, the third conference member identity corresponding to the public media data packet is a conference member identity that currently multiplexes the VPP channel, that is, the CPS is currently triggering an RTP channel which corresponds to the third conference member identity and is between the CPS and a user equipment corresponding to the third conference member identity to forward the public media data packet on the VPP channel, and accordingly, the CFS does not need to generate an RTCP multiplexing start command corresponding to the third conference member identity for the CPS.

Step 209: The CFS forwards the media data packet corresponding to each conference member identity to the CPS through an RTP channel corresponding to each conference member identity, so that the CPS forwards the media data packet corresponding to each conference member identity to a user equipment corresponding to each conference member identity.

In this embodiment, when the media data packets corresponding to the first conference member identity, the second conference member identity, and the third conference member identity have different content, and a frequency of same content of each media data packet is 1, the CFS forwards the media data packet corresponding to the first conference member identity to the CPS through an RTP channel which corresponds to the first conference member identity and is between the CFS and the CPS, and then the CPS forwards the media data packet corresponding to the first conference member identity to the user equipment corresponding to the first conference member identity through the RTP channel which corresponds to the first conference member identity and is between the CPS and the user equipment corresponding to the first conference member identity. Meanwhile, the CFS forwards the media data packet corresponding to the second conference member identity to the CPS through an RTP channel which corresponds to the second conference member identity and is between the CFS and the CPS, and then the CPS forwards the media data packet corresponding to the second conference member identity to the user equipment corresponding to the second conference member identity through the RTP channel which corresponds to the second conference member identity and is between the CPS and the user equipment corresponding to the second conference member identity. The CFS forwards the media data packet corresponding to the third conference member identity to the CPS through an RTP channel which corresponds to the third conference member identity and is between the CFS and the CPS, and then the CPS forwards the media data packet corresponding to the third conference member identity to the user equipment corresponding to the third conference member identity through the RTP channel which corresponds to the third conference member identity and is between the CPS and the user equipment corresponding to the third conference member identity.

In this embodiment, a CFS establishes, with a CPS, according to a received VPP channel establishment request sent by the CPS, a VPP channel corresponding to a conference identity in the VPP channel establishment request, acquires a media data packet corresponding to each conference member identity in the VPP channel establishment request, and when there are media data packets with same content in the media data packet corresponding to each conference member identity, acquires a media data packet with a highest content repeat frequency among the media data packets as a public media data packet, and forwards the public media data packet to the CPS through the VPP channel; and acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel, thereby reducing repeated delivering of media, overcoming a defect in the prior art that downlink bandwidth resources are wasted because the conference floor server needs to deliver media to each conference access party, and further improving a bandwidth utilization ratio.

Further, in another embodiment of the present invention, based on the embodiment shown in FIG. 2A and FIG. 2B, the method may further include acquiring, by the CFS, from conference member identities that currently multiplex the VPP channel, a conference member identity that does not need to multiplex the VPP channel, generating an RTCP multiplexing stop command corresponding to the conference member identity that does not need to multiplex the VPP channel, and delivering the RTCP multiplexing stop command to the CPS, so that the CPS forwards, according to the RTCP multiplexing stop command, a media data packet on an RTP channel corresponding to the conference member identity that does not need to multiplex the VPP channel, to a user equipment corresponding to the conference member identity.

In this embodiment, when the user to which the user equipment corresponding to the first conference member identity belongs stops speaking, and the user to which the user equipment corresponding to the second conference member identity belongs starts to speak, that is, the users to which the user equipments corresponding to the first conference member identity and the third conference member identity belong are listeners, the CPS generates an RTCP multiplexing stop command corresponding to the first conference member identity, and delivers the RTCP multiplexing stop command to the CPS through the RTCP channel which corresponds to the first conference member identity and is between the CFS and the CPS, and when receiving the RTCP multiplexing stop command corresponding to the first conference member identity, the CPS instructs the RTP channel which corresponds to the first conference member identity and is between the CPS and the user equipment corresponding to the first conference member identity to stop transmitting the public media data packet on the VPP channel starting from a certain media data packet serial number, and meanwhile, to start to transmit the media data packet which corresponds to the first conference member identity and is on the RTP channel between the CFS and the CPS.

In addition, the user to which the user equipment corresponding to the second conference member identity belongs speaks, and the users to which the user equipments corresponding to the first conference member identity and the third conference member identity belong are listeners, that is, the media data packets which are acquired by the CFS and correspond to the first conference member identity and the third conference member identity have same content, that is, a frequency of same content of the media data packets is 2, which is the highest relative to a frequency 1 of same content of the media data packet which is acquired by the CFS and corresponds to the second conference member identity, the media data packet corresponding to the first conference member identity or the third conference member identity serves as a public media data packet, and the public media data packet is forwarded to the CPS through an RTP channel in the VPP channel. Meanwhile, the CFS generates an RTCP multiplexing start command corresponding to the first conference member identity, and forwards the RTCP multiplexing start command corresponding to the first conference member identity to the CPS through an RTCP channel on the VPP channel. After receiving the RTCP multiplexing start command corresponding to the first conference member identity, the CPS instructs the RTP channel which corresponds to the first conference member identity and is between the CPS and the user equipment corresponding to the first conference member identity to transmit the public media data packet on the VPP channel starting from a certain media data packet serial number.

It should be further noted that, the user to which the user equipment corresponding to the third conference member identity belongs is still a listener, and therefore, the CFS does not need to deliver an RTCP multiplexing stop command corresponding to the third conference member identity, that is, the CPS continues to instruct the RTP channel which corresponds to the third conference member identity and is between the CPS and the user equipment corresponding to the third conference member identity to transmit the public media data packet on the VPP channel.

For example, FIG. 3 is an extended diagram of an RTCP multiplexing start command or an RTCP multiplexing stop command on an application-layer self-defined type structure body of an RTCP. As shown in FIG. 3, V may be filled with 2; a payload type (PT) field may be filled with 204, application (APP); "application-dependent data" is used for defining the RTCP multiplexing start command or the RTCP multiplexing stop command; and for other fields (for example: a subtype; a length, a synchronization source identity (SSRC)/contributing source identity (CSRC), and a name (American Standard Code for Information Interchange (ASCII)), reference may be made to Request For Comments (RFC) 3550. A structure of "Application-dependent data" is as follows:

1. In a case of an RTCP multiplexing start command:
   1) an RTCP multiplexing start command identity, which occupies 16 bits, and is an unsigned integer (int) of 16 bits in a network byte order, and is filled with 0;
   2) a serial number N of a last RTP packet of a UE channel (the RTP channel corresponding to the conference member identity), which occupies 16 bits, and is an unsigned int of 16 bits in a network byte order, and indicates to the CPS the last RTP packet currently sent on the RTP channel of the UE, a packet after which is acquired from the VPP channel, and specifically acquired from the RTP channel on the VPP channel; and
   3) a serial number M of an RTP packet from which VPP channel multiplexing starts, which occupies 16 bits, and is an unsigned int of 16 bits in a network byte order, and indicates to the CPS which RTP packet the VPP channel multiplexing starts from.
2. In a case of an RTCP multiplexing stop command:
   1) an RTCP multiplexing stop command identity, which occupies 16 bits, and is an unsigned int of 16 bits in a network byte order, and is filled with 1; and
   2) a serial number M of a last RTP packet for which the VPP channel is multiplexed, which occupies 16 bits, and is an unsigned int of 16 bits in a network byte order, and indicates to the CPS the serial number of the last RTP packet of this multiplexing, an RTP packet after which is acquired from a UE channel (e.g., the RTP channel corresponding to the conference member identity).

Figure 4:
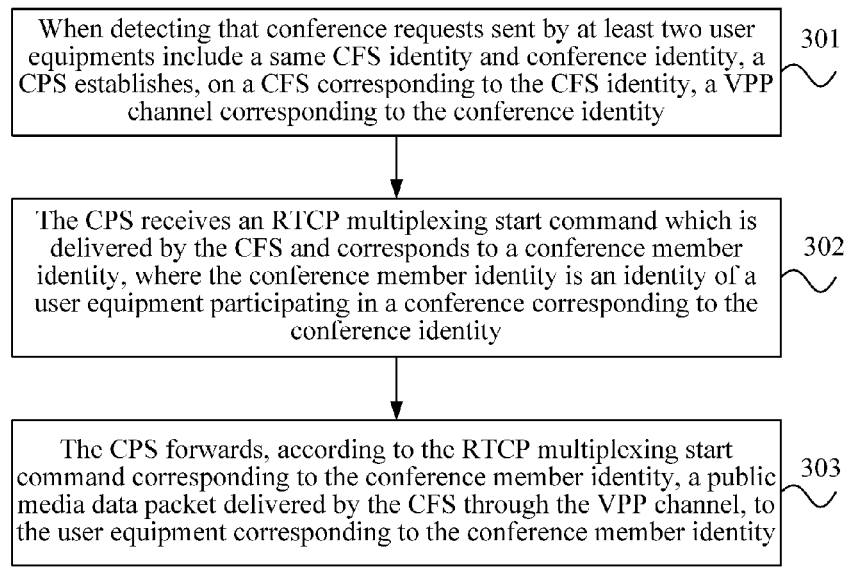
FIG. 4 is a flowchart of another embodiment of a method for processing a media data packet according to the present invention.

FIG. 4 is a flowchart of another embodiment of a method for processing a media data packet according to the present invention. As shown in FIG. 4, the method in this embodiment includes:

Step 301: When detecting that conference requests sent by at least two user equipments include a same CFS identity and conference identity, a CPS establishes, on a CFS corresponding to the CFS identity, a VPP channel corresponding to the conference identity.

In this embodiment, a user equipment sends a conference request to the CPS, where the conference request may include a CFS identity and a conference identity, and the conference identity may be a conference number, which is a unique identity for the CFS to determine a conference. In addition, the CPS records a CFS identity and conference identity corresponding to each user equipment, for example, the CPS stores the CFS identity and conference identity corresponding to each user equipment in a database of the CPS, or in a process memory.

When the CPS detects that conference requests sent by at least two user equipments include a same CFS identity and conference identity, it indicates that at least two user equipments apply for a same conference on a CFS, and accordingly, the CPS may send a VPP channel establishment request to the CFS, where the channel establishment request includes a conference identity and a conference member identity corresponding to the conference identity, so as to establish, with the CFS, a VPP channel corresponding to the conference identity. A specific implementation manner of the VPP channel may be the implementation manner of the VPP channel in the method embodiment shown in FIG. 1. It should be further noted that, the conference member identity is an identity of a user equipment participating in a conference corresponding to the conference identity.

Step 302: The CPS receives an RTCP multiplexing start command which is delivered by the CFS and corresponds to a conference member identity, where the conference member identity is an identity of a user equipment participating in the conference corresponding to the conference identity.

Step 303: The CPS forwards, according to the RTCP multiplexing start command corresponding to the conference member identity, a public media data packet delivered by the CFS through the VPP channel, to the user equipment corresponding to the conference member identity.

The CFS may execute the technical solution of the method embodiment shown in FIG. 1 or FIG. 2A and FIG. 2B, of which implementation principles are similar, and details are not repeatedly described herein.

It should be further noted that, in this conference, for another conference member identity except the conference member identity that receives the RTCP multiplexing start command, the CPS may trigger an RTP channel which corresponds to the another conference member identity and is between the CPS and a user equipment corresponding to the another conference member identity to forward a media data packet forwarded by the CFS through an RTP channel which corresponds to the another conference member identity and is between the CFS and the CPS, to the user equipment corresponding to the another conference member identity.

In this embodiment, a CPS forwards, according to an RTCP multiplexing start command which is delivered by a CFS and corresponds to a conference member identity, a public media data packet delivered by the CFS through a VPP channel, to a user equipment corresponding to the conference member identity, where the VPP channel is a VPP channel which is established by the CPS, when the CPS detects that conference requests sent by at least two user equipments include a same CFS identity and conference identity, on a CFS corresponding to the CFS identity and corresponds to the conference identity, thereby reducing repeated delivering of media data packets with same content by the CFS, overcoming a defect in the prior art that downlink bandwidth resources are wasted because the conference floor server needs to deliver media to each conference access party, and further improving a bandwidth utilization ratio.

Further, in another embodiment of the present invention, based on the embodiment shown in FIG. 4, the method further includes: receiving, by the CPS, an RTCP multiplexing stop command which is delivered by the CFS and corresponds to the conference member identity; and stopping, by the CPS, according to the RTCP multiplexing stop command corresponding to the conference member identity, forwarding the public media data packet on the channel to the user equipment corresponding to the conference member identity, and forwarding the media data packet delivered by the CFS through an RTP channel corresponding to the conference member identity, to the user equipment corresponding to the conference member identity.

Figure 5:
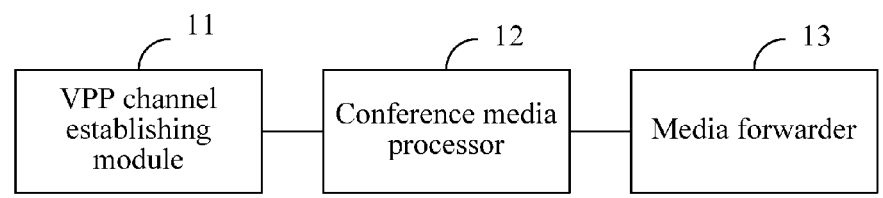
FIG. 5 is a schematic structural diagram of an embodiment of a CFS according to the present invention.

FIG. 5 is a schematic structural diagram of an embodiment of a CFS according to the present invention. As shown in FIG. 5, the CFS in this embodiment includes a VPP channel establishing module 11, a conference media processor 12, and a media forwarder 13. The VPP channel establishing module 11 is configured to receive a VPP channel establishment request sent by a CPS, where the VPP channel establishment request includes a conference identity and a conference member identity corresponding to the conference identity; and establish, with the CPS, according to the VPP channel establishment request, a VPP channel corresponding to the conference identity. The conference media processor 12 is configured to acquire a media data packet corresponding to each conference member identity, and when there are media data packets with same content in the media data packet corresponding to each conference member identity, acquire a media data packet with a highest frequency of same content among the media data packets as a public media data packet. The media forwarder 13 is configured to forward the public media data packet to the CPS through the VPP channel. The conference media processor 12 is further configured to acquire, from conference member identities corresponding to the public media data packet, a conference member identity that currently does not multiplex the VPP channel, generate an RTCP multiplexing start command corresponding to the conference member identity that currently does not multiplex the VPP channel, and deliver the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel.

In this embodiment, the CFS may execute the technical solution of the method embodiment shown in FIG. 1, of which implementation principles are similar, and details are not repeatedly described herein.

In this embodiment, a CFS establishes, with a CPS, according to a received VPP channel establishment request sent by the CPS, a VPP channel corresponding to a conference identity in the VPP channel establishment request, acquires a media data packet corresponding to each conference member identity in the VPP channel establishment request, and when there are media data packets with same content in the media data packet corresponding to each conference member identity, acquires a media data packet with a highest content repeat frequency among the media data packets as a public media data packet, and forwards the public media data packet to the CPS through the VPP channel; and acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel, thereby reducing repeated delivering of media, overcoming a defect in the prior art that downlink bandwidth resources are wasted because the conference floor server needs to deliver media to each conference access party, and further improving a bandwidth utilization ratio.

Furthermore, in another embodiment of the present invention, based on the embodiment shown in FIG. 5, the conference media processor 12 is further configured to acquire, from conference member identities that currently multiplex the VPP channel, a conference member identity that does not need to multiplex the VPP channel, generate an RTCP multiplexing stop command corresponding to the conference member identity that does not need to multiplex the VPP channel, and deliver the RTCP multiplexing stop command to the CPS, so that the CPS forwards, according to the RTCP multiplexing stop command, a media data packet on an RTP channel corresponding to the conference member identity that does not need to multiplex the VPP channel, to a user equipment corresponding to the conference member identity that does not need to multiplex the VPP channel.

Furthermore, the media forwarder 13 is further configured to: when there are no data packets with same content in the media data packet corresponding to each conference member identity, forward the media data packet corresponding to each conference member identity to the CPS through an RTP channel corresponding to each conference member identity, so that the CPS forwards the media data packet corresponding to each conference member identity to a user equipment corresponding to each conference member identity.

Furthermore, the media forwarder 13 is further configured to forward another media data packet except the public media data packet to the CPS through an RTP channel corresponding to a conference member identity corresponding to the another media data packet, so that the CPS forwards the another media data packet to a user equipment corresponding to the conference member identity corresponding to the another media data packet.

In this embodiment, the CFS may execute the technical solution of the method embodiment shown in FIG. 2A and FIG. 2B, of which implementation principles are similar, and details are not repeatedly described herein.

In this embodiment, a CFS establishes, with a CPS, according to a received VPP channel establishment request sent by the CPS, a VPP channel corresponding to a conference identity in the VPP channel establishment request, acquires a media data packet corresponding to each conference member identity in the VPP channel establishment request, and when there are media data packets with same content in the media data packet corresponding to each conference member identity, acquires a media data packet with a highest content repeat frequency among the media data packets as a public media data packet, and forwards the public media data packet to the CPS through the VPP channel; and acquires, from conference member identities corresponding to the public media data packet, a conference member identity that currently does not multiplex the VPP channel, generates an RTCP multiplexing start command corresponding to the conference member identity that currently does not multiplex the VPP channel, and delivers the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel, thereby reducing repeated delivering of media, overcoming a defect in the prior art that downlink bandwidth resources are wasted because the conference floor server needs to deliver media to each conference access party, and further improving a bandwidth utilization ratio.

Figure 6:
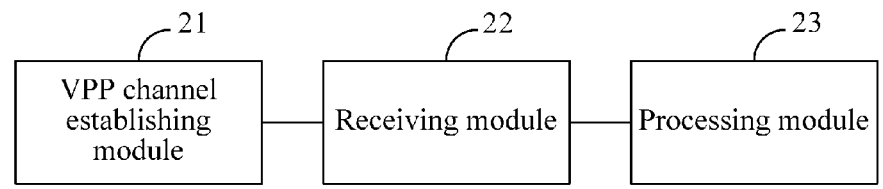
FIG. 6 is a schematic structural diagram of an embodiment of a CPS according to the present invention.

FIG. 6 is a schematic structural diagram of an embodiment of a CPS according to the present invention. As shown in FIG. 6, the CPS in this embodiment includes a VPP channel establishing module 21, a receiving module 22, and a processing module 23. The VPP channel establishing module 21 is configured to, when detecting that conference requests sent by at least two user equipments include a same CFS identity and conference identity, establish, on a CFS corresponding to the CFS identity, a VPP channel corresponding to the conference identity. The receiving module 22 is configured to receive an RTCP multiplexing start command which is delivered by the CFS and corresponds to a conference member identity, where the conference member identity is an identity of a user equipment participating in a conference corresponding to the conference identity. The processing module 23 is configured to forward, according to the RTCP multiplexing start command corresponding to the conference member identity, a public media data packet delivered by the CFS through the VPP channel, to the user equipment corresponding to the conference member identity.

In this embodiment, the CPS may execute the technical solution of the method embodiment shown in FIG. 4, of which implementation principles are similar, and details are not repeatedly described herein.

In this embodiment, a CPS forwards, according to an RTCP start command which is delivered by a CFS and corresponds to a conference member identity, a public media data packet delivered by the CFS through a VPP channel, to a user equipment corresponding to the conference member identity, where the VPP channel is a VPP channel which is established by the CPS, when the CPS detects that conference requests sent by at least two user equipments include a same CFS identity and conference identity, on a CFS corresponding to the CFS identity and corresponds to the conference identity, thereby reducing repeated delivering of media data packets with same content by the CFS, overcoming a defect in the prior art that downlink bandwidth resources are wasted because the conference floor server needs to deliver media to each conference access party, and further improving a bandwidth utilization ratio.

Further, in another embodiment of the present invention, based on the embodiment shown in FIG. 6, the receiving module 22 is further configured to receive an RTCP multiplexing stop command which is delivered by the CFS and corresponds to the conference member identity; and accordingly, the processing module 23 is further configured to stop, according to the RTCP multiplexing stop command, forwarding the public media data packet on the VPP channel to the user equipment corresponding to the conference member identity, and forward the media data packet delivered by the CFS through an RTP channel corresponding to the conference member identity, to the user equipment corresponding to the conference member identity.

Figure 7:
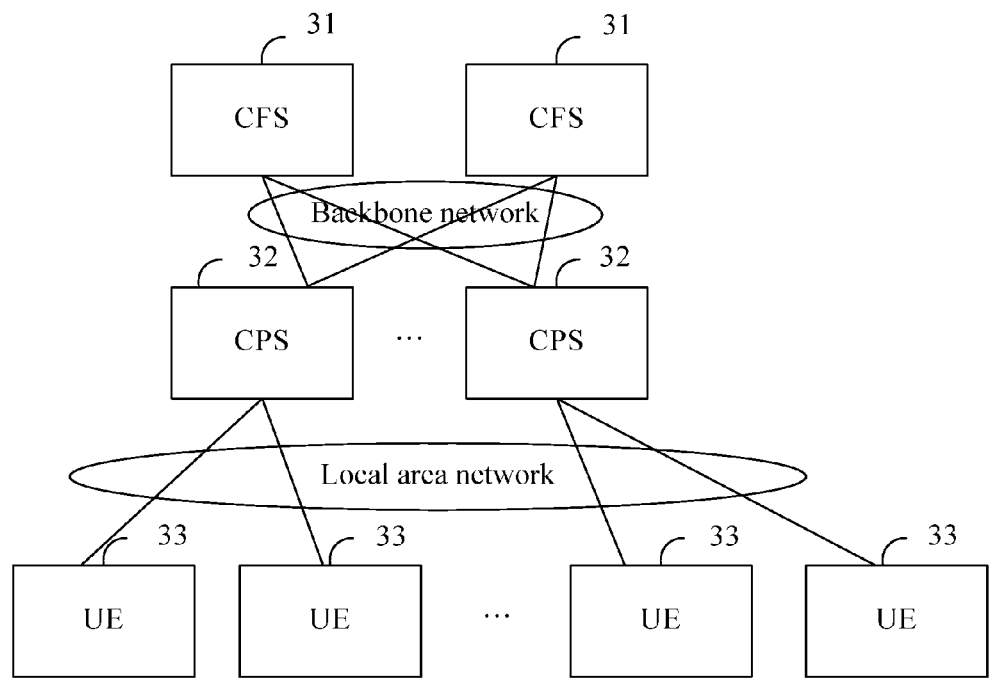
FIG. 7 is a schematic structural diagram of an embodiment of a conference system according to the present invention.

FIG. 7 is a schematic structural diagram of an embodiment of a conference system according to the present invention. As shown in FIG. 7, the conference system in this embodiment includes: a CFS 31, a CPS 32, and a user equipment (UE) 33. The CFS 31 may execute the technical solution of the method embodiment shown in FIG. 1 or FIG. 2A and FIG. 2B, and the CPS 32 may execute the technical solution of the method embodiment shown in FIG. 3, of which implementation principles are similar, and details are not repeatedly described herein.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium may include any medium capable of storing program codes, such as a read-only memory (ROM), a random-access memory (RAM), a magnetic disk, or an optical disc.

The foregoing apparatus embodiments are merely exemplary. Units described as separate components may be or may not be physically separated. Components shown as units may be or may not be physical units, that is, may be located in one place, or may also be distributed to at least two network units. A part or all of the modules may be selected according to actual demands to achieve the objectives of the solutions of the embodiments. Persons of ordinary skill in the art may understand and implement the present invention without making creative efforts.

Finally, it should be noted that the foregoing embodiments are merely provided for describing the technical solutions of the present invention, but not intended to limit the present invention. Although the present invention is described in detail with reference to the foregoing embodiments, persons of ordinary skill in the art should understand that, they may still make modifications to the technical solutions described in the foregoing embodiments, or equivalent replacements to part of technical features in the technical solutions; however, these modifications or replacements do not cause the essence of corresponding technical solutions to depart from the spirit and scope of the technical solutions of the embodiments of the present invention.

What is claimed is:

1. A method for processing a media data packet, comprising:

receiving, by a conference floor server (CFS), a virtual public participant (VPP) channel establishment request sent by a conference proxy server (CPS), wherein the VPP channel establishment request comprises a conference identity and a conference member identity corresponding to the conference identity, and establishing, with the CPS, according to the VPP channel establishment request, a VPP channel corresponding to the conference identity;

acquiring, by the CFS, a media data packet corresponding to each conference member identity, and when there are media data packets with same content in the media data packet corresponding to each conference member identity, acquiring a media data packet with a highest frequency of same content among the media data packets as a public media data packet, and forwarding the public media data packet to the CPS through the VPP channel; and acquiring, by the CFS, from conference member identities corresponding to the public media data packet, a conference member identity that currently does not multiplex the VPP channel, generating a real-time transport protocol control protocol (RTCP) multiplexing start command corresponding to the conference member identity that currently does not multiplex the VPP channel, and delivering the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel.

2. The method for processing a media data packet according to claim 1, further comprising acquiring, by the CFS, from conference member identities that currently multiplex the VPP channel, a conference member identity that does not need to multiplex the VPP channel, generating an RTCP multiplexing stop command corresponding to the conference member identity that does not need to multiplex the VPP channel, and delivering the RTCP multiplexing stop command to the CPS such that the CPS stops, according to the RTCP multiplexing stop command, forwarding a public media data packet on the VPP channel to a user equipment corresponding to the conference member identity that does not need to multiplex the VPP channel, and forwards, according to the RTCP multiplexing stop command, a media data packet delivered by the CFS through an RTP channel corresponding to the conference member identity that does not need to multiplex the VPP channel, to the user equipment corresponding to the conference member identity that does not need to multiplex the VPP channel.

3. The method for processing a media data packet according to claim 1, further comprising, when there are no data packets with same content in the media data packet corresponding to each conference member identity, forwarding, by the CFS, the media data packet corresponding to each conference member identity to the conference proxy server through an RTP channel corresponding to each conference member identity such that the CPS forwards the media data packet corresponding to each conference member identity to a user equipment corresponding to each conference member identity.

4. The method for processing a media data packet according to claim 1, further comprising forwarding, by the CFS, another media data packet except the public media data packet to the CPS through an RTP channel corresponding to a conference member identity corresponding to the another media data packet such that the CPS forwards the another media data packet to a user equipment corresponding to the conference member identity corresponding to the another media data packet.

5. A method for processing a media data packet, comprising:

establishing, by a conference proxy server (CPS), on a conference floor server (CFS) corresponding to a CFS identity, a virtual public participant (VPP) channel corresponding to a conference identity when detecting that conference requests sent by at least two user equipments comprise the same CFS identity and conference identity;

receiving, by the CPS, a real-time transport protocol control protocol (RTCP) multiplexing start command which is delivered by the CFS and corresponds to a conference member identity, wherein the conference member identity is an identity of a user equipment participating in a conference corresponding to the conference identity;

forwarding, by the CPS, according to the RTCP multiplexing start command corresponding to the conference member identity, a public media data packet delivered by the CFS through the VPP channel, to the user equipment corresponding to the conference member identity;

receiving, by the CPS, an RTCP multiplexing stop command which is delivered by the CFS and corresponds to the conference member identity; and stopping, by the CPS, according to the RTCP multiplexing stop command, forwarding the public media data packet on the VPP channel to the user equipment corresponding to the conference member identity, and forwarding a media data packet delivered by the CFS through a real-time transport protocol (RTP) channel corresponding to the conference member identity, to the user equipment corresponding to the conference member identity.

6. A conference floor server (CFS), comprising:

a virtual public participant (VPP) channel establishing module configured to receive a VPP channel establishment request sent by a conference proxy server (CPS), wherein the VPP channel establishment request comprises a conference identity and a conference member identity corresponding to the conference identity, and establish, with the CPS, according to the VPP channel establishment request, a VPP channel corresponding to the conference identity;

a conference media processor configured to acquire a media data packet corresponding to each conference member identity, and when there are media data packets with same content in the media data packet corresponding to each conference member identity, acquire a media data packet with a highest frequency of same content among the media data packets as a public media data packet; and a media forwarder configured to forward the public media data packet to the CPS through the VPP channel, wherein the conference media processor is further configured to acquire, from conference member identities corresponding to the public media data packet, a conference member identity that currently does not multiplex the VPP channel, generate a real-time transport protocol control protocol (RTCP) multiplexing start command corresponding to the conference member identity that currently does not multiplex the VPP channel, and deliver the RTCP multiplexing start command to the CPS, so that the CPS starts, according to the RTCP multiplexing start command, to forward the public media data packet on the VPP channel to a user equipment corresponding to the conference member identity that currently does not multiplex the VPP channel.

7. The CFS according to claim 6, wherein the conference media processor is further configured to acquire, from conference member identities that currently multiplex the VPP channel, a conference member identity that does not need to multiplex the VPP channel, generate an RTCP multiplexing stop command corresponding to the conference member identity that does not need to multiplex the VPP channel, and deliver the RTCP multiplexing stop command to the CPS, so that the CPS forwards, according to the RTCP multiplexing stop command, a media data packet on a real-time transport protocol (RTP) channel corresponding to the conference member identity that does not need to multiplex the VPP channel, to a user equipment corresponding to the conference member identity that does not need to multiplex the VPP channel.

8. The CFS according to claim 6, wherein the media forwarder is further configured to, when there are no data packets with same content in the media data packet corresponding to each conference member identity, forward the media data packet corresponding to each conference member identity to the CPS through an RTP channel corresponding to each conference member identity such that the CPS forwards the media data packet corresponding to each conference member identity to a user equipment corresponding to each conference member identity.

9. The CFS according to claim 6, wherein the media forwarder is further configured to forward another media data packet except the public media data packet to the CPS through an RTP channel corresponding to a conference member identity corresponding to the another media data packet such that the CPS forwards the another media data packet to a user equipment corresponding to the conference member identity corresponding to the another media data packet.

10. A conference proxy server (CPS), comprising:

a virtual public participant (VPP) channel establishing module configured to, when detecting that conference requests sent by at least two user equipments comprise a same conference floor server (CFS) identity and conference identity, establish, on a CFS corresponding to the CFS identity, a VPP channel corresponding to the conference identity;

a receiving module configured to receive a real-time transport protocol control protocol (RTCP) multiplexing start command which is delivered by the CFS and corresponds to a conference member identity, wherein the conference member identity is an identity of a user equipment participating in a conference corresponding to the conference identity; and a processing module configured to forward, according to the RTCP multiplexing start command corresponding to the conference member identity, a public media data packet delivered by the conference floor server through the VPP channel, to the user equipment corresponding to the conference member identity, wherein the receiving module is further configured to receive an RTCP multiplexing stop command which is delivered by the CFS and corresponds to the conference member identity, and wherein the processing module is further configured to stop, according to the RTCP multiplexing stop command corresponding to the conference member identity, forwarding the public media data packet on the VPP channel to the user equipment corresponding to the conference member identity, and forward a media data packet delivered by the CFS through a RTP channel corresponding to the conference member identity, to the user equipment corresponding to the conference member identity.

11. A conference system, comprising:
a conference floor server (CFS);
a conference proxy server (CPS); and
at least two user equipments,
wherein the CPS is configured to, when detecting that conference requests sent by the at least two user equipments comprise a same CFS identity and conference identity, establish on the CFS corresponding to the CFS identity, a virtual public participant (VPP) channel corresponding to the conference identity, receive a real-time transport protocol control protocol (RTCP) multiplexing start command which is delivered by the CFS and corresponds to a conference member identity that currently does not multiplex the VPP channel, wherein the conference member identity is an identity of a user equipment participating in a conference corresponding to the conference identity, and forward according to the RTCP multiplexing start command corresponding to the conference member identity, a public media data packet delivered by the CFS through the VPP channel, to the user equipment corresponding to the conference member identity, and wherein the CFS is configured to receive the VPP channel establishment request sent by the CPS, establish, with the CPS, according to the VPP channel establishment request, the VPP channel corresponding to the conference identity, acquire a media data packet corresponding to each conference member identity, and when there are media data packets with same content in the media data packet corresponding to each conference member identity, acquire a media data packet with a highest frequency of same content among the media data packets as a public media data packet, and forward the public media data packet to the CPS through the VPP channel, and is further configured to acquire from conference member identities corresponding to the public media data packet, the conference member identity that currently does not multiplex the VPP channel, generate the RTCP multiplexing start command, and deliver the RTCP multiplexing start command to the CPS.

* * * * *